United States Patent [19]

Ingvast

[11] Patent Number: 5,775,103
[45] Date of Patent: Jul. 7, 1998

[54] APPARATUS FOR PURIFYING A FLUID BY VACUUM TREATMENT

[76] Inventor: Hakan Ingvast, Sagudden 21, S-890 Sjalevad, Sweden

[21] Appl. No.: 553,374

[22] PCT Filed: Apr. 27, 1994

[86] PCT No.: PCT/SE94/00378

§ 371 Date: Mar. 21, 1996

§ 102(e) Date: Mar. 21, 1996

[87] PCT Pub. No.: WO94/28316

PCT Pub. Date: Dec. 8, 1994

[30] Foreign Application Priority Data

May 25, 1993 [SE] Sweden ............... 9301768
Nov. 9, 1993 [SE] Sweden ............... 9303680

[51] Int. Cl.[6] ............................................. F16D 31/02
[52] U.S. Cl. ........................... 60/453; 60/454; 60/488
[58] Field of Search ........................... 60/453, 454, 487, 60/488

[56] References Cited

U.S. PATENT DOCUMENTS 4,348,864  9/1982  Ichimura et al. .................. 60/454
4,432,775  2/1984  Won .................................. 55/41
5,020,324  6/1991  MacDonald et al. ............ 60/454 X
5,317,872  6/1994  Ingvast ............................ 60/453 X
5,493,860  2/1996  Bjerke et al. ..................... 60/454 X
5,600,953  2/1997  Oshita et al. ..................... 60/453

FOREIGN PATENT DOCUMENTS 0 206 119  12/1986  European Pat. Off. .
2 221 551  11/1973  Germany .
29 48 674   6/1980  Germany .
29 37 957   1/1981  Germany .

*Primary Examiner*—Hoang Nguyen
*Attorney, Agent, or Firm*—IP Group of Pillsbury Madison & Sutro LLP

[57] ABSTRACT

A purification apparatus for removing gases and water from a fluid in a system, including a tank which has an expansion chamber for fluid in the system. A pump pumps the fluid in a circulation circuit of which the purification apparatus is an integral part. A closed chamber has a fluid-free upper part and contains a level-sensing device which controls flow of fluid to the closed chamber. The fluid-free upper part of the closed chamber is connected with a vacuum pump which sucks gases from the closed chamber and creates a lower pressure in the closed chamber than at an outlet of the apparatus. A pressure-generating device sucks fluid from the closed chamber.

7 Claims, 4 Drawing Sheets

APPARATUS FOR PURIFYING A FLUID BY VACUUM TREATMENT

This application claims benefit of international application PCT/SE94/0078, filed Apr. 27, 1994.

BACKGROUND OF THE DISCLOSURE

This invention relates to a method and an apparatus for a fluid operated system where the condition of the fluid has a great importance for the reliability and the life length of the system. The system preferably comprises a hydraulic system in a mobile machine.

Hydraulic technique is common in different types of mobile working machines and is utilized for the propulsion of the machine as well as for the control and the working functions of the machine.

The propulsion is made by a so called hydrostatic transmission which is an advanced hydraulic system with a separate feeding circuit. The remaining functions of mobile machine are almost without exception driven by a hydraulic system in which force-transmitting pumps suck hydraulic medium directly from a hydraulic tank. The different hydraulic systems of a vehicle normally have the same hydraulic medium and a common hydraulic tank.

Oils are utilized as a hydraulic medium. Most common are mineral oils but for environmental reasons vegetable oils are utilized to an increasing extent. The oils are in a varying degree an article of consumption which has to be periodically exchanged.

The hydraulic tank is normally open towards the outer atmosphere so that the hydraulic oil gets a direct contact with the air. Due to that fact the oil of the tank will be more or less saturated with different air gases. In addition to that the water will be concentrated in the tank by the fact that during temperature reductions the water steam of the atmospheric air becomes supersaturated and condensates to water drops on internal tank surfaces. Moreover, solid particles accompany the incoming air in spite of the fact that this air is filtrated. Due to the direct air contact, the oil becomes polluted in different ways which contributes to the fact that the operation conditions of the hydraulic systems are deteriorated.

Oxygen, which is one of the air gases dissolved into the oil, contributes to the chemical breaking down of minerally and vegetably based hydraulic oils as well as of different rubber products. This process is accelerated during increases temperature. A high oxygen content of the oil also contributes to an increased corrosion and gives an increased wear of internal surfaces.

Air as well as free bubbles in the oil causes an efficiency reduction, a high oil temperature, a high sound level and erosion damages in pumps. Pumps sucking oil directly from the tank are especially exposed for this risk.

Water is a severe pollution which contributes to a quick stop-up of filters and hurries up the breaking down of hydraulic oils. The water is supplied to the oil from the outside but is also created as a rest product during the chemical breaking down of the oil.

Great efforts are made for keeping the hydraulic oil in the best condition and to prevent the oil from being polluted. This is made by a powerful filtration, by frequent oil and filter exchanges and by different constructive measures. In spite of these measures, the oil of the hydraulic tank is normally saturated with both air and water which, as has been stated previously, gives a shorter life length and to a worse reliability of the functions of the hydraulic system.

By way of introduction, the main features of the conventional technique shall be described here.

FIG. 1 is a diagram with ISO symbols describing an hydraulic system with a hydrostatic transmission comprising a pump 51 which has a variable deplacement and is connected with a motor 52 to a closed circuit which can have a high pressure and where the flow direction can be reversed. The two transmission units, below called the hydraulic machines, can work in all four operation quadrants, i.e. the rotational as well as the torque direction of the hydraulic motor can be reversed.

A feeding circuit of the transmission comprises a feeding pump 53 which sucks oil from the tank 54 and puts the closed circuit under pressure via the non-return valves 55. The hydraulic oil of the closed circuit is during operation continuously mixed with oil from the feeding circuit. A flow corresponding to the flow of the feeding pump is then returned to the tank 54 due to the fact that oil passes a reverse valve 58 and via the connections 61 and 62. In this way heat and pollutions are taken away from the closed high pressure circuit. The return flow is normally subjected to purification via filters as well as cooling via a heat exchanger. The oil of the feeding circuit always passes in its circulation through the tank 54, whereby free air bubbles in the oil can escape to the atmosphere. The pressure limitation valves 56 and 57 determine the pressure of the feeding circuit. The pressure of the closed circuit is determined by particular valves which are not shown in the diagram.

The hydraulic tank 54 of the system comprises a container which is partly filled with oil and the inner part of which has a connection with the outer atmosphere via a so called air filter. The air filter reduces but does not prevent particles of different kind from penetrating the tank from the outside. The tank functions as an expansion room for oil of the system, and the atmospheric pressure in the tank constitutes the feeding pressure of the oil which is supplied to connected pumps via a so called suction pipe.

The respective hydraulic machine is of an axial piston type and is characterized by the fact that the rotating parts freely rotate in a surrounding housing. In the mentioned housing there are also bearings for the rotating parts and here the leakage oil is collected and passes further out of the housing in a so called drainage pipe. The mentioned hydraulic machines can be said to comprise the housings 59 and 60 and the framed components according to FIG. 1. The flow from the valves 56 and 57 passes normally directly out into the mentioned housings and is removed together with the leakage oil via the drainage pipes 61 and 62.

The mentioned draw backs in a normal, hydraulic system have in accordance with the invention PCT/SE90/00714 H Ingvast, been removed by the fact the hydraulic oil partly is completely cut off from a contact with the outer atmosphere, partly by an active purification of particles as well as air and water. The invention which is a complete service unit is shown in its main features in FIG. 2 and is here connected with the above described hydrostatic transmission.

The service unit has a closed container 63 which has a return connection 66 and a pressure connection 67. The closed container comprises a chamber 64 of negative pressure to which partly a vacuum pump 68, partly a return connection 66 are connected via a pressure-reducing element 70 and a filter 71. In the container there is furthermore a pressure-generating element 69 which comprises a centrifugal pump. This pump puts the over-pressure chamber 65 of the container under pressure, which chamber is in a direct connection with the pressure connection 67. An inner circulation circuit is received by the passage of the oil directly from the over-pressure chamber back to the chamber of negative pressure via the pressure-reducing element 70 and the filter 71. A cooler for the oil is normally positioned in the inner circuit but has here been replaced by an external cooler 2.

The chamber of negative pressure is only to a certain extent filled with oil. Here a strong atmospheric negative pressure is created which has the consequence that air dissolved into the oil escapes to the fluid surface and leaves the container via the vacuum pump. Pressure and temperature are at the same time adapted so that water freely existing in the oil is boiled away and escapes in the same way as the air. It is to be noted that oil during operation will never get in contact with atmospheric air which has the consequence that the remaining amount oxygen dissolved into the oil will be consumed concurrently with the oxidation being reduced. The low pressure in the chamber of negative pressure has the consequence that volume variations of the oil influence the pressure of the chamber to a low degree. Thus, the chamber functions also as an expansion room for the oil of the system.

The described method accordingly removes the mentioned deficiencies regarding the condition of the oil and creates an over-atmospheric pressure in the connected suction pipe 50. Thus, the surface unit comprises, in one unit, a hydraulic tank, a filter, a cooler and a feeding pump of a normal system. Moreover, a continuous dewatering and deaeration of the oil is made independently if other parts of the system is in operation or not.

A draw back with the method according to FIG. 2 is that the container under certain circumstances has an unsufficient volume. This has a validity above all in systems with great volume variations and where the need of reserve oil is great due to the risk of leakage. Such circumstances have normally validity in mobile working machines. Here are partly a number of hydraulic cylinders having the consequence that the oil volume varies in the tank, and partly is the risk of leakage obvious during for instance a tube brake. Another draw back with the described method arises during a stop in the system, because there is a risk then that air is sucked in via for instance shaft gaskets if the equipment has not been completed in that way that the vacuum pressure is prevented from being spaced. Therefore, the method according to FIG. 2 is primarily suitable for application in industrial systems which work more or less continuously.

SUMMARY OF THE INVENTION

This invention relates to a new method which does not have the mentioned draw backs but which in the same way as in the above mentioned method conditions the oil in a comprehensive way.

The invention shall now be described with reference to the accompanying drawings, in which:

FIGS. 1 and 2 show prior art systems which are described in the Background section.

FIG. 3 shows an embodiment of the invention connected to a hydraulic system in the form of a hydraulic transmission of that type which is usual in mobile machines. FIGS. 4 and 5 show alternative driving devices. FIGS. 6 and 7 show two embodiments of a hydraulically driven vacuum pump. FIG. 8 is an alternative embodiment of the invention where a motor housing is utilized as a part of the condition-creating apparatus. FIG. 9 shows a valve which senses the level and the medium.

DETAILED DESCRIPTION

Figure 1:
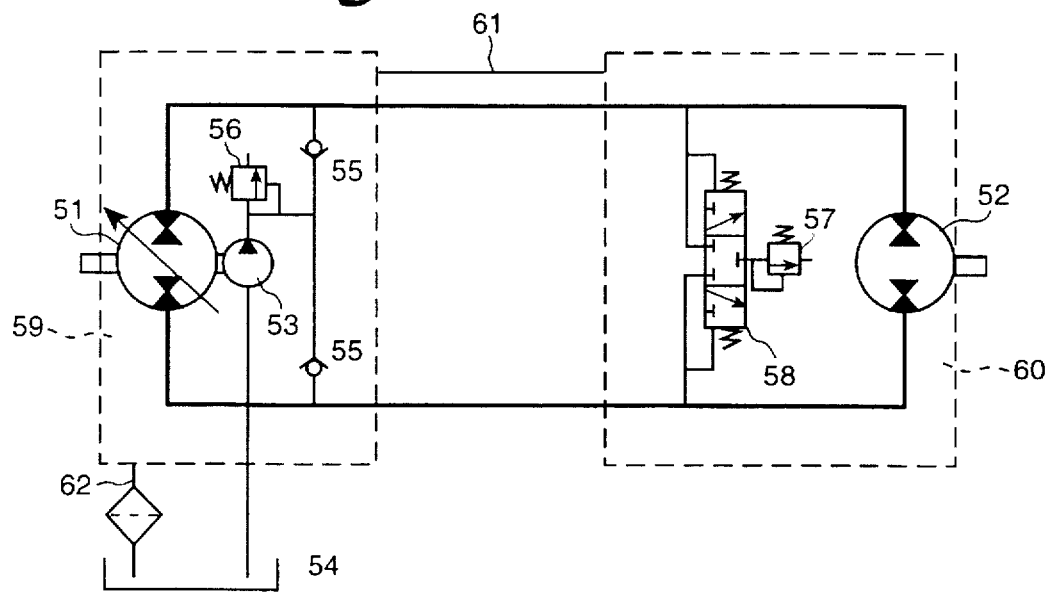
Figure 2:
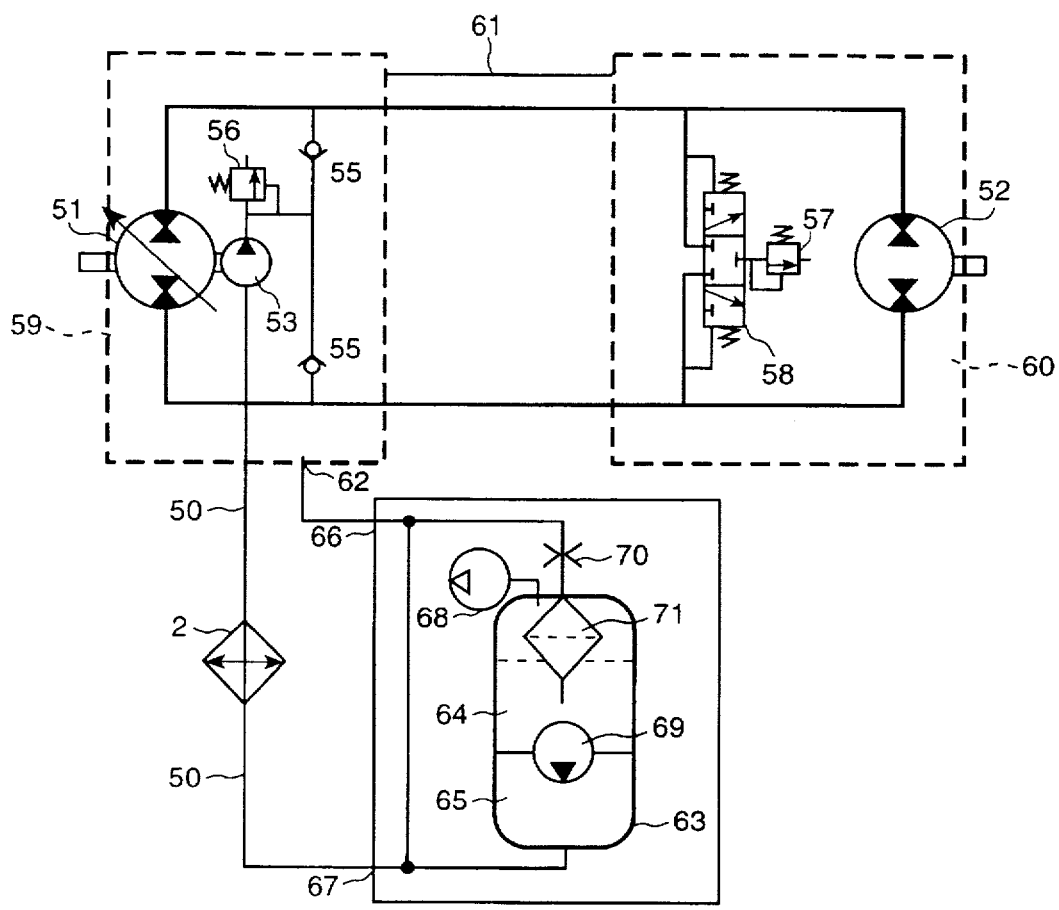
Figure 3:
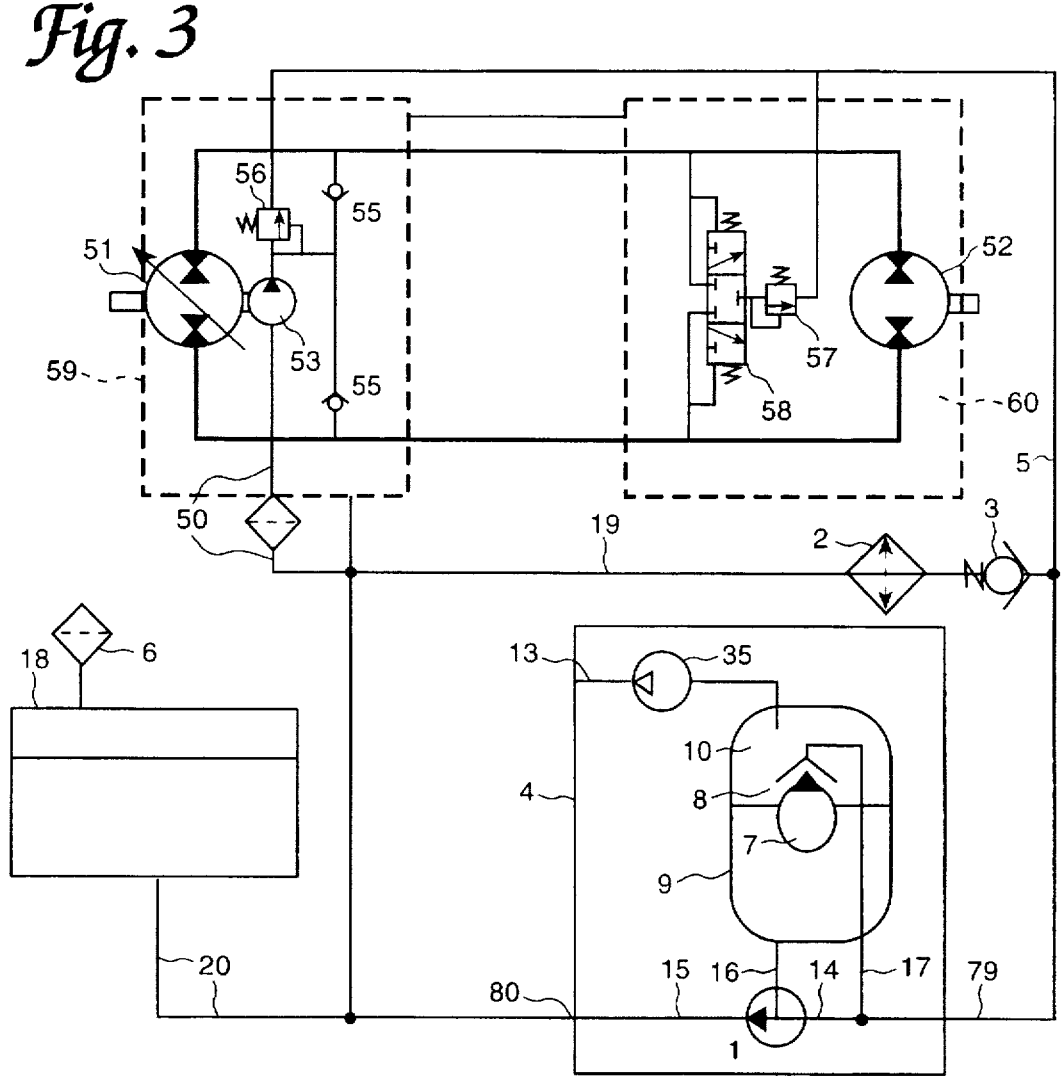

From FIG. 3 is apparent an embodiment of the invention, which is in similarity with the previous figure connected to a hydraulic system in the form of a hydrostatic transmission. However, the invention may be a part of all types of hydraulic systems comprising one or more pumps, the suction pipes of which are in connection with each other.

As has been described previously there is in the transmission a feeding pump 53 which sucks oil via the suction pipe 50 and puts the closed circuit under pressure via the non return valves 55. The hydraulic oil in the closed circuit is under operation continuously mixed with oil from the feeding circuit. A flow corresponding to the flow of the feeding pump is then returned to the return pipe 5 by the fact that oil passes a reverse valve 58 and via the connection 57. In this way, heat and pollutions are taken away from the closed high-pressure circuit. The return flow is subjected to purification via filters as well as cooling via a heat exchanger.

The oil of the feeding circuit passes in its circulation circuit in this case back to the suction pipe 50 without passing the tank 18. Therefore, the oil in the tank becomes passive but is in connection with the active oil in the system by a pipe 20. In the mentioned circulation circuit in which the connection 5 is a part oil passes a purification apparatus 4, the purpose of which is to separate air and water from the oil in similarity with the previously described method.

The active oil of the system does not pass through the tank 18 where the oil becomes saturated with different air gases. If the circulation circuit of the oil should also comprise the tank, the active oil will continuously be supplied with air gases which are removed by the purification apparatus 4. This fact would reduce the efficiency of the purification. Due to the fact that the tank oil is made inactive, a higher degree of purification of the active oil is achieved at the same time as the passive oil in the tank gets a low temperature and a slow velocity of braking down.

The purification apparatus 4 comprises a room which is completely closed from the outer atmosphere, which is here in the form of a container 9. An ejector pump 1 is driven by the pressure difference between the inlet 79 of the apparatus and the outlet 80 of the apparatus, which like the connection 5 are parts of the circulation circuit which the oil flow from the pump 53 carries out. The mentioned pressure difference is in this case determined by the pressure-reducing influence by the non-return valve 3.

A device sensing the level maintains an almost constant oil level in the container. The device comprises a float 7, the movement of which is capable of varying the throttling effect of the throttling 8. Due to that fact the amount of fluid is maintained on a relatively constant level. If the level is too high, the throttling effect increases so that the flow sucked out via the suction connection 16 of the ejector becomes larger than the flow supplied via the intake 8 and the feed pipe 17.

A vacuum pipe 13 is connected with that part 10 of the container which is free from fluid. The vacuum pump can be electrically or mechanically driven by the main motor of the vehicle and is either of membrane, wing or piston type, but it can also be an ejector pump which is driven by a gas or a liquid. The vacuum pump is directly or indirectly controlled by the pressure of the container. Depending upon the choice of the pump type there is required a non-return valve in order to maintain the pressure.

The ejector pump 1, the suction connection of which is joined with that part of the container which is filled with fluid, has a normal design. An oil flow passes from the inlet 79 via the pressure connection 14 of the ejector through a nozzle with a high streaming velocity. The flow passes thereafter a so called diffusor before it passes to the return connection 15 and further to the outlet 80. The diffusor comprises a channel which expands slightly and where the kinetic energy of the oil is transformed to pressure energy. The suction connection 16 of the ejector is joined with the two remaining connections between the mentioned nozzle and diffusor.

The lowermost pressure in the container 9 is determined by the vacuum pump and is not below the pressure that the ejector pump can achieve. Thus, the ejector pump has a positive flow through the suction connection 16 even for the highest existing negative pressure of the container 9. Therefore, the oil passing the ejector, theoretically, becomes supersaturated with gases dissolved into the oil and an insignificant amount of free gas bubbles is represented in the return flow during a short time.

The pressure of the inlet of the pump 53 is directly dependent upon the pressure of the tank 18. The oil of the tank is influenced by the atmospheric pressure via the filter 6 but the tank can well be made entirely closed and be put under an over-pressure via a gas. This over-pressure increases the filling degree and reduces the risk of cavitation during cold starting circumstances. If the pressure of the tank is allowed to vary, a pressure-regulating valve is used, having the consequence that the diffusor of the ejector always works with the same pressure difference independently of the pressure of the tank 18. An example of valve function is described in connection to FIG. 6.

Oil is either supplied to or taken away from the tank via the pipe 20 dependently upon volume variations in the system. If the volume of the pipe 20 is large in relation to the normal volume variations of the system, the interaction between the active, conditioned oil and the tank oil will be small. Therefore, the pipe 20 may with advantage be made coarse and with a certain part of its length positioned internally in the tank in order to increase the volume of the pipe. Then the active oil is supplied with oxygen and air gases only to a limited extent and the passive oil remains at a low temperature.

When the pump 53 stops, the ejector effect ceases and the created negative pressure in the container sucks hydraulic fluid from the tank until the pressure has been equalized. When the pump is started, the condition is automatically restored by the work of the ejector pump.

The shown embodiment according to FIG. 3 is generally usable in all existing systems containing one or more pumps preferably of deplacement type. The said pumps need not have the function of a feeding pump or a main pump of the system but the pump driving the purification apparatus may be a part of the system only for this purpose.

Figure 4:
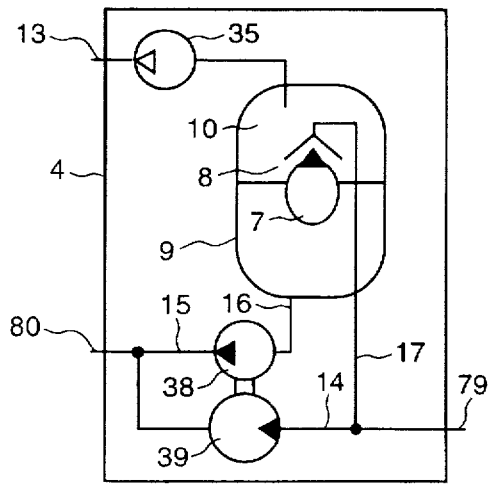
Figure 5:
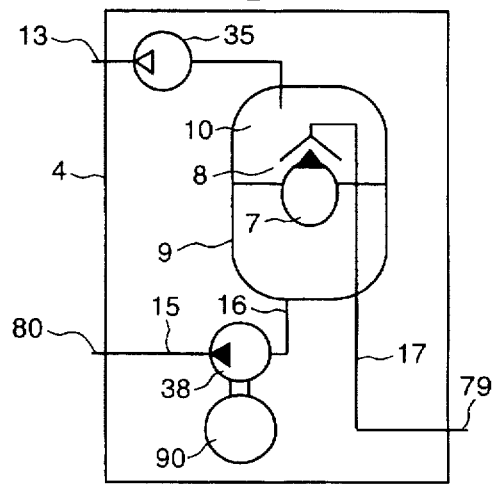

The mentioned ejector pump, principally, can be replaced by a conventional pump of deplacement type or centrifugal type. FIG. 4 shows such a embodiment where the conventional pump 38 in the same way as the ejector sucks oil from the suction connection 16. The pump is driven by the motor 39 which like the ejector is driven by the flow of the circulation circuit. It is realized that a conventional pump replacing the ejector pump also can be driven in another way. All oil through the outlet 80 then will pass through the container 9. FIG. 5 shows an embodiment where the pump is driven by an electrical motor 90.

The vacuum pump in the embodiment according to FIG. 3 is normally electrically driven and its operation requires besides electric supply also pressure and temperature control. These requirements are in certain cases a drawback and a simplification is then desirable. The following shows an embodiment of the purification apparatus without these drawbacks and where the vacuum pump is hydraulically driven.

Figure 6:
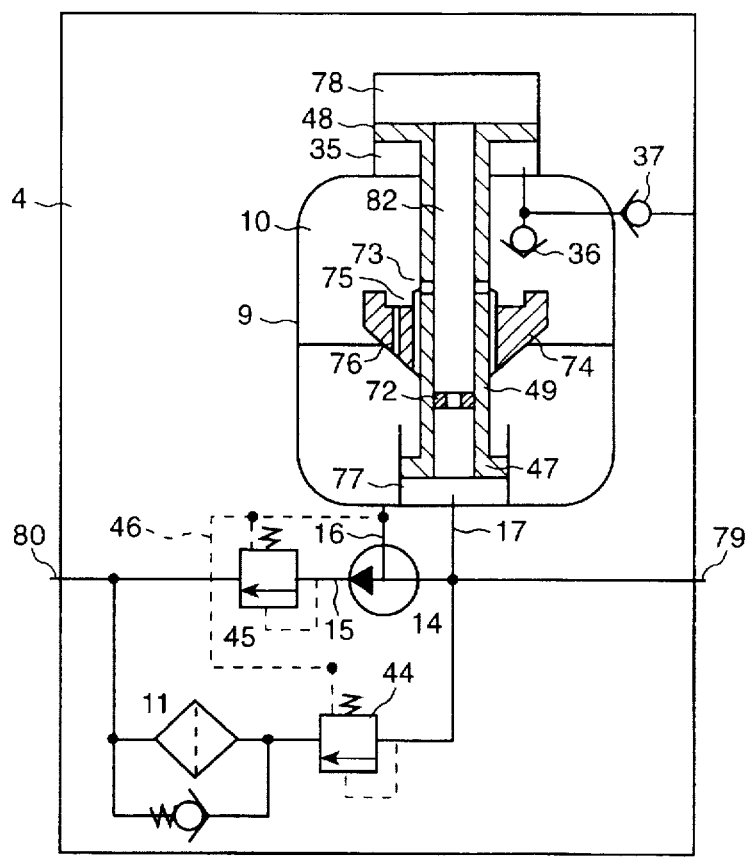

FIG. 6 shows an embodiment where the function of the vacuum pump is brought about by a piston device which like a watch carries out its strikes periodically and concurrently with the variation of the oil level. The piston device has a lower cylinder with a piston 47 connected via a common piston rod 49 with an upper cylinder having a piston 48. The chamber 77 of the lower cylinder is connected to the incoming flow via the feeding pipe 17 and the inlet 79 of the apparatus. The chamber 77 is in a hydraulic connection with the plus chamber 78 of the upper cylinder by a hole in the piston rod. The minus chamber 35 of the upper cylinder comprises the vacuum pump itself and is in connection with that part 10 of the container which is not filled with fluid via a non-return valve 36 and with the outer atmosphere via a non-return valve 37. The piston device is controlled partly by the arcal difference and partly by the pressure difference between the chambers 77 and 78 and that is brought about by the influence from a float 74 in the following way.

The oil flow through the container passes a primary throttling 72 with a stationary adjustment and thereafter a secondary throttling 73, here represented by a hole in the piston rod. This throttling has a varying influence due to the fact that the hole can be covered or uncovered dependently upon the position of the float. When the hole is covered the pistons move downwards and air is pumped out to the atmosphere and when the hole is uncovered the contrary occurs and air is sucked into the vacuum pump.

Oil is continuously sucked out of the container via the ejector valve 1, whereby the float moves downwards under presumption that the secondary throttling in the form of the throttling hole 73 is covered. A constructive adaptation of piston areas and flows through the throttling 72 makes that the piston rod with the throttling hole moves downwards with a higher velocity than the float. The piston movement is therefore resting and becomes stationary when the pistons have reached its lower end position. When the level has sunk so much that the float uncovers the throttling hole 73, the pressure of the chamber 78 is reduced so much that the piston device moves upwards, whereby the volume of the minus chamber 35 increases so that air is sucked in via the non-return valve 36.

The movement upwards is initiated by the fact that the first oil volume passing out of the throttling hole 73 is partly caught up in a depression 75 of the float so that this one is weightloaded and is lowering to a new lower level in relation to the fluid surface, whereby the throttling hole is uncovered with a great margin. The instreaming oil flow via the throttling hole 73 is now larger than the oil flow sucked out and the piston device as well as the float move upwards. The initial lowering of the float in relation to the oil level during the beginning of the movement going upwards makes that the float and by that also the oil level shall rise a longer distance than the piston device before this one has reached its upper end position. When the level has risen so much that the covering effect of the float on the hole 73 is approaching the balance point where the ingoing flow via the hole 73 is as large as the outgoing flow via the suction connection 16, the pressure of the connection between the primary and the secondary throttlings rises. Before the balance point is reached, the pressure in the chamber 78 increases so that the movement downwards of the piston device begins, having the consequence that the throttling hole 73 is entirely covered and that the instreaming flow ceases. In this position the float slowly returns to an upper level in relation to the oil level due to the fact that the oil volume of the depression 75 is evacuated via a ring gap 76.

The described course presumes that the depression of the float is evacuated when the float is in its lower turning position. Therefore, the mentioned depression of the float can with advantage be covered in that way that there is created an inner room there. Such a measure eliminates the risk that the depression is unintentionally filled with fluid when this one splashes to and fro in the container.

In order to bring about a constant outflow via the suction connection 16 of the ejector, the pressure before and after the ejector is controlled by two pressure limitation valves 44 and 45 which are here marked with their standardized symbols according to ISO. The valves are drained towards the suction connection 16 of the ejector via the pipe 46 and that fact has the consequence that the pressure differences in the connections 14 and 15 in relation to the suction connection are constant. The valve 44 in this embodiment replaces the non-return valve 3 in the embodiment according to FIG. 3 and all return oil from the system is intended to pass via the inlet 79. The filter 11 and possibly also the cooler are in this embodiment suitably positioned after the valve 44 so that they form a unit with the purification apparatus 4.

Figure 7:
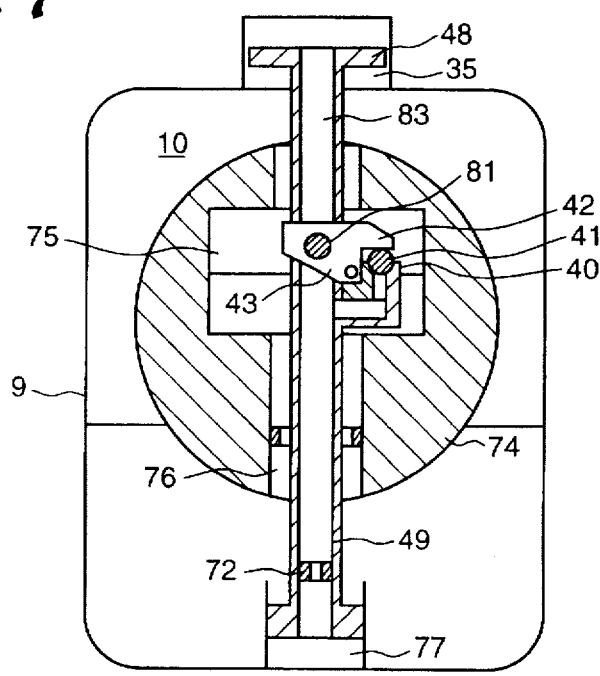

The float according to the above mentioned moves linearly along the piston rod and brings about the mentioned secondary throttling of the oil flow to the container. A relatively long linear movement with a small clearance means a certain risk of fastening for different reasons and a small float movement with a large force intensification is therefore desirable. FIG. 7 shows how this can be accomplished by having the float connected with the piston rod of the piston device via a rocker movement.

Here are only shown those parts of the purification apparatus which are concerned by the description. Omitted parts are assumed to be identical with those according to the embodiment according to FIG. 6. The container 9 is assumed to be cylinder-formed as previously and the upper piston room can with advantage be an integral part in the same cylinder. The float, which could have an outer spherical form and be positioned in the centre of the cylinder, is connected with a rocker 42 via a shaft 81. The mentioned shaft has an extension perpendicularly to the plane of the paper and the float inarticulately arranged at the ends of the shaft so that the float can turn itself about the shaft with a low resistance. The rocker 42 is articulately connected with a valve seat 40 via a shaft hinge 43 and its rocking movement influences a valve element 41. The valve seat is fastened to the piston rod and is in a hydraulic connection with its hole going through the rod so that the mentioned secondary throttling effect is accomplished by the movement of the rocker.

The float has an inner room 75 which receives the inflow to the container via the secondary throttling. The inner room is drained via a ring gap 76 between a vertical hole through the float and the piston rod. The device functions in accordance with the description above. The inner room of the flat is entirely or partly filled up when the piston device moves upwards and is evacuated when it moves downwards. The spherical form of the float and central position of the float in the centre of the cylindrical container has the consequence that the position and force influence of the float become relatively independent of the inclination of the container.

The described method is one of several possible ways to create a hydraulically driven vacuum pump. It is for instance possible for the valve seat 40 in principle to be fastened to the container instead of being fastened to the moveable piston rod. The rocker in such a case has to perform larger movements and the construction becomes more complicated but the effect will be the same. It is also possible that the pressure force going out from the piston 47 may be replaced by a spring force.

A possible embodiment of the purification apparatus built up analogously with that according to FIG. 6 or FIG. 7 has the form of a cylinder, in the upper part of which the piston 48 and the vacuum pump chamber 35 are integral parts, in the middle part of which the connections 79, 80 are positioned, and in which the demountable, lower part of the chamber comprises a filter 11. The filter comprises a filter element and a filter container which is demounted when exchanging the filter element. The purification apparatus will be like a pipe having a length of 0.5–1 meter and being provided with hydraulic inlets and outlets in the vicinity of its half length.

Figure 8:
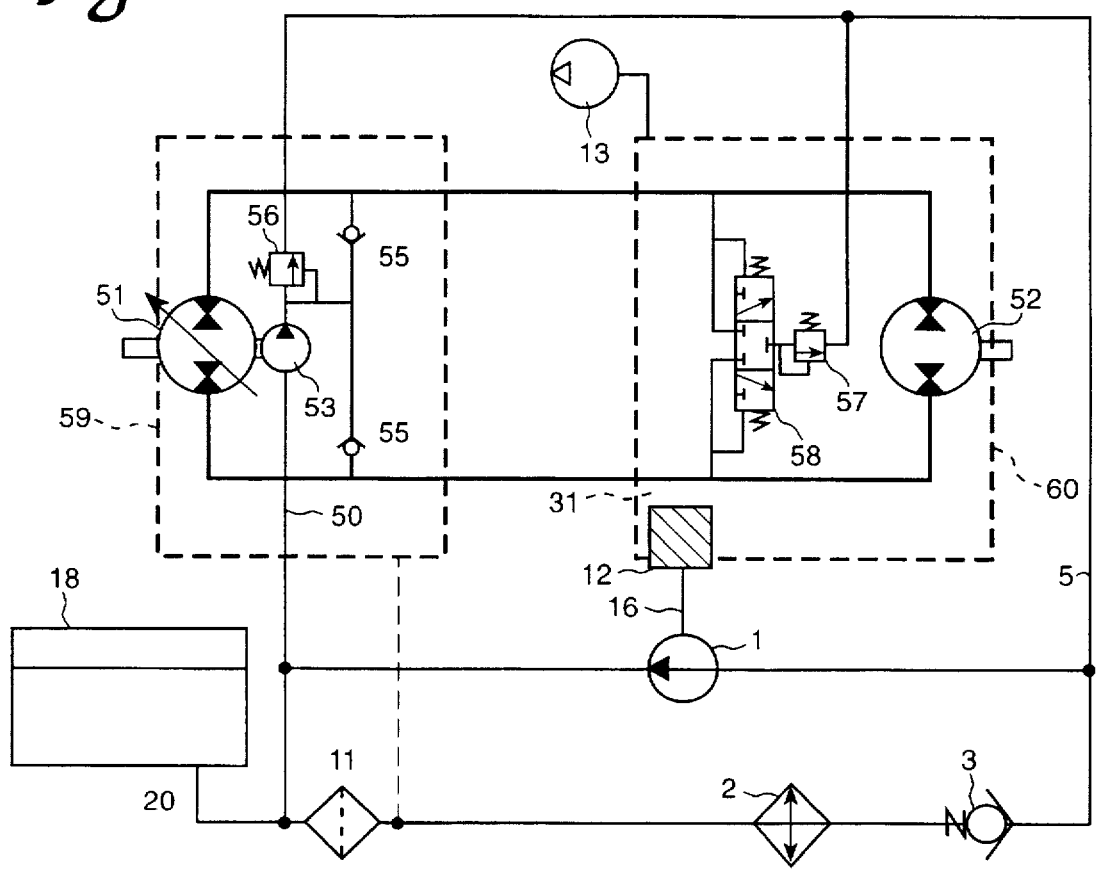

FIG. 8 shows an application of the invention where the closed room comprises the housing 60 of the motor 52. That means that the motor housing replaces the container 9 in previous figures. The rotating parts of the motor are intented preferably to be in that part of the housing which is not filled with fluid. This is an advantage since the losses are reduced especially in motors going hastily. The same method can be applied in pump bodies or in gear boxes.

The level-regulating device here comprises a valve 12 sensing media and positioned on the suction connection of the ejector 1. The ejector pump only sucks oil due to the fact that the valve 12 in this case only allows passage of a fluid but closes the passage of a gas. The vacuum pump 35 has its suction connection directly joined to the motor housing at its upper part.

Figure 9:
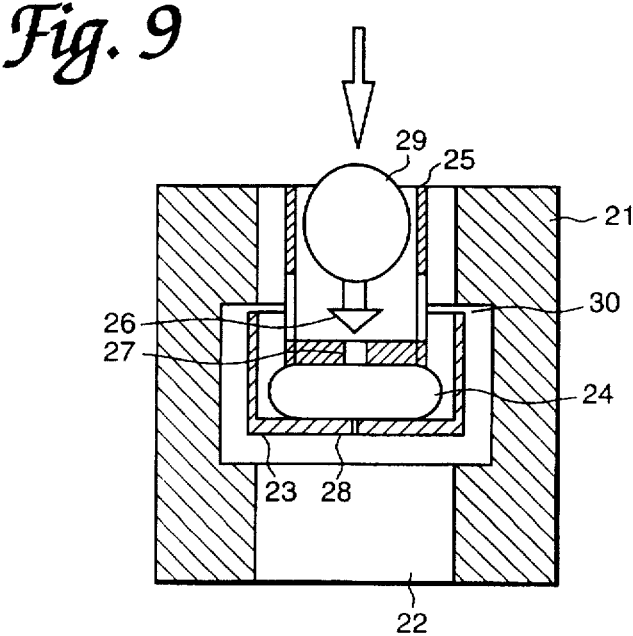

From FIG. 9 is apparent an embodiment of the mentioned valve 12 sensing media. The valve with its valve body 21 is opened for flows in the direction of the arrow. The outlet 22 of the valve has by that a lower pressure than its inlet. The wall at which the pilot opening 27 is positioned has a stationary connection with the upper part of a metal bellows 24 with the valve body 21 itself and with the supporting sleeve 25. A valve element 23 controls the flow let through via the opening area of a ring gap 30. The valve element is maintained in closed position by the spring force of the metal bellows 24. The inner part of the bellows 24 is connected with the outlet side of the valve via a throttling hole 28 and via its inlet side via a pilot opening 27. When having the valve open the opening 27 is considerably larger than the opening of the throttling hole 28. The opening area at 27 is controlled by a valve element 26 which is connected together with a floating body 29. If the valve element 26 has been removed further from the opening 27 due to the fact that the floating body is surrounded by a fluid, the pressure inside the bellows becomes the same as the pressure at inlet side with the consequence that the valve gets a low opening pressure.

When mounted in accordance with the figure a fluid is allowed to pass with a low opening pressure, whereas a gas will close the pilot opening resulting in a highest opening pressure. When mounting in a reverse order so that the outlet opening 22 is turned upwards, the function will be the reversed one, i.e. a gas is allowed to pass with a low opening pressure. Thus, the valve may with advantage be connected to the connection of the vacuum pump in order to prevent that oil is sucked into the pump.

It can also be desirable to connect together a plurality of purification devices in order to achieve an increased quality. If the purification apparatus according to FIG. 3 or FIG. 7 as well as the purification apparatus according to FIG. 8 are introduced into one and the same system in parallel circuits, it is possible to get a good capacity regarding deaeration and dewatering and at the same time a simple method of reducing the losses in pumps and motors.

I claim:

1. A purification apparatus for purifying fluids by vacuum treatment, comprising:

a closed chamber having a fluid-free upper part and containing a level-sensing device which controls flow of fluid to the chamber and causes variation of the fluid level in the chamber, with phases of raising and lowering;

an inner piston chamber fitted with a piston, which constitutes a vacuum pump and moves concurrently with the variation of said fluid level, and which pumps gas in said closed chamber, out of the apparatus; and a pressure-generating device which sucks fluid from the closed chamber.

2. A purification apparatus for removing gases and water from a fluid in a system, comprising:

a tank which comprises an expansion chamber for fluid in the system;

a pump which pumps the fluid in a circulation circuit of which said purification apparatus is an integral part;

a closed chamber having a fluid-free upper part and containing a level-sensing device which controls flow of fluid to the closed chamber and said fluid-free upper part of said closed chamber being in connection with a vacuum pump which sucks gases from said closed chamber and creates a lower pressure in said closed chamber that at an outlet of said apparatus; and a pressure-generating device which sucks fluid from said closed chamber.

3. The apparatus according to claim 2, wherein:

said pump is arranged to take driving energy from fluid flow in said circulation circuit.

4. The apparatus according to claim 2, wherein:

said pressure-generating device comprises an ejector pump having a pressure connection joined with an inlet of said apparatus;

said inlet having a return connection joined with said outlet of the apparatus; and a suction connection joined with a lower part of the closed chamber, which is filled with fluid.

5. The apparatus according to claim 2, wherein:

said closed chamber comprises a housing for one of a hydraulic pump and a motor existing in said system, said housing being an integral part of said apparatus.

6. The apparatus according to claim 2, further including:

a filter for filtering said fluid during circulation thereof in said circulation circuit, for removing particles, the apparatus comprises a continuous cylinder, to a lower edge of which said filter is connectable so that the fluid passing said inlet of said apparatus is filtered.

7. The apparatus according to claim 2, wherein:

said vacuum pump includes a level-sensing device which controls flow of fluid to said closed chamber, and causes variation of the fluid level in the closed chamber, with phases of raising and lower; and an inner piston chamber fitted with a piston which constitutes a vacuum pump and moves concurrently with the variation of said fluid level, and which pumps gas in the closed chamber, out of the apparatus.

* * * * *